(12) United States Patent
Shinohara et al.

(10) Patent No.: US 7,607,694 B2
(45) Date of Patent: Oct. 27, 2009

(54) STEERING DEVICE

(75) Inventors: Eiji Shinohara, Gunma-ken (JP); Kouji Hirooka, Gunma-ken (JP)

(73) Assignee: Yamada Manufacturing Co., Ltd., Kiryu-shi, Gunma-ken (JP)

( * ) Notice: Subject to any disclaimer, the term of this patent is extended or adjusted under 35 U.S.C. 154(b) by 552 days.

(21) Appl. No.: 11/392,610

(22) Filed: Mar. 30, 2006

(65) Prior Publication Data

US 2006/0230864 A1 Oct. 19, 2006

(30) Foreign Application Priority Data

Mar. 31, 2005 (JP) .............................. 2005-101071

(51) Int. Cl.
*B62D 1/18* (2006.01)
*B62D 1/185* (2006.01)
*B62D 1/19* (2006.01)

(52) U.S. Cl. .......................... 280/775; 280/777; 74/493

(58) Field of Classification Search ................. 280/775, 280/777; 74/493
See application file for complete search history.

(56) References Cited

U.S. PATENT DOCUMENTS

| | | | | |
|---|---|---|---|---|
| 4,627,306 A | * | 12/1986 | Berenjian | 74/492 |
| 4,958,852 A | * | 9/1990 | Kohno et al. | 280/775 |
| 5,088,767 A | * | 2/1992 | Hoblingre et al. | 280/775 |
| 5,105,677 A | * | 4/1992 | Hoblingre et al. | 74/493 |
| 5,117,707 A | * | 6/1992 | Kinoshita et al. | 74/493 |
| 5,240,284 A | * | 8/1993 | Takada et al. | 280/775 |
| 5,477,744 A | * | 12/1995 | Hoblingre et al. | 74/493 |
| 5,503,431 A | * | 4/1996 | Yamamoto | 280/777 |
| 5,524,927 A | * | 6/1996 | Toussaint | 280/777 |
| 6,068,295 A | * | 5/2000 | Skabrond et al. | 280/775 |
| 6,139,057 A | * | 10/2000 | Olgren et al. | 280/775 |
| 6,234,528 B1 | * | 5/2001 | Ben-Rhouma et al. | 280/777 |
| 6,367,840 B1 | * | 4/2002 | Duval et al. | 280/777 |
| 6,523,432 B1 | * | 2/2003 | Yamamoto et al. | 74/492 |
| 6,659,504 B2 | * | 12/2003 | Riefe et al. | 280/777 |
| 2002/0030356 A1 | * | 3/2002 | Bohlen et al. | 280/777 |

FOREIGN PATENT DOCUMENTS

JP 2000-16303 1/2000

\* cited by examiner

*Primary Examiner*—Paul N. Dickson
*Assistant Examiner*—George D. Spisich
(74) *Attorney, Agent, or Firm*—McGinn IP Law Group, PLLC

(57) ABSTRACT

To provide a steering device from which good operation feeling can be obtained in tilt and telescoping adjustments, and whose configuration is very simple.

The cylindrical part formed in a pair of shock absorber members is inserted in the two end openings of an axial through hole formed in the axial direction of a collar member, flanges of the shock absorber members are slidably inserted into adjustment elongated holes formed on both sides in the width direction of a movable bracket, the movable bracket is arranged between fixed support side plates formed on both sides in the width direction of a fixed bracket. A bolt is passed through adjustment holes formed in the fixed support side plates, the adjustment elongated holes, the collar member, and the shock absorber members to be freely tightened as required.

12 Claims, 8 Drawing Sheets

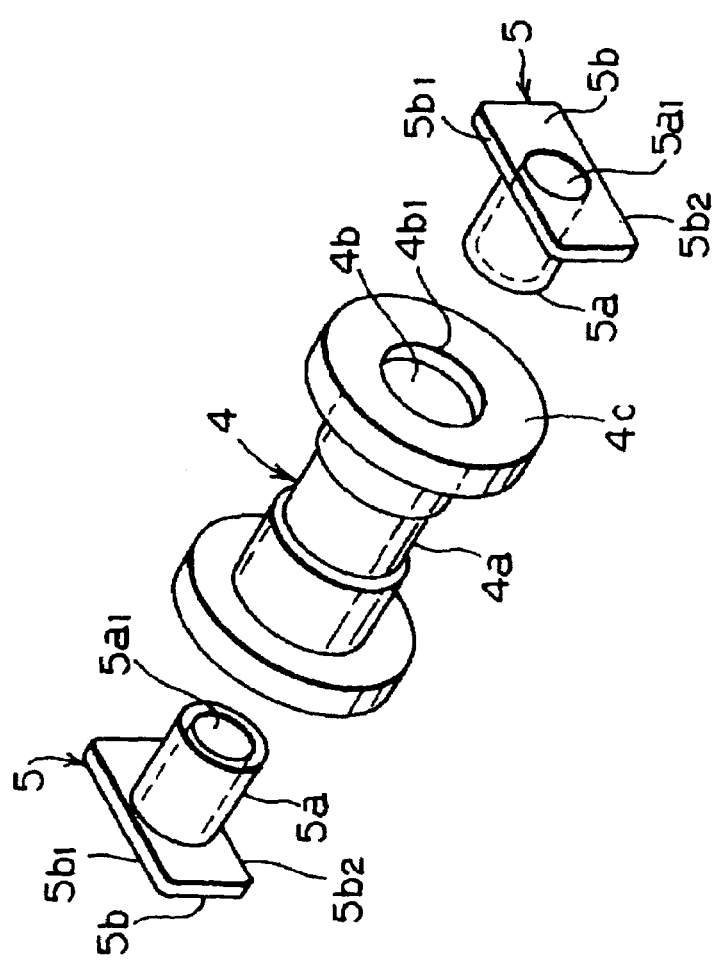
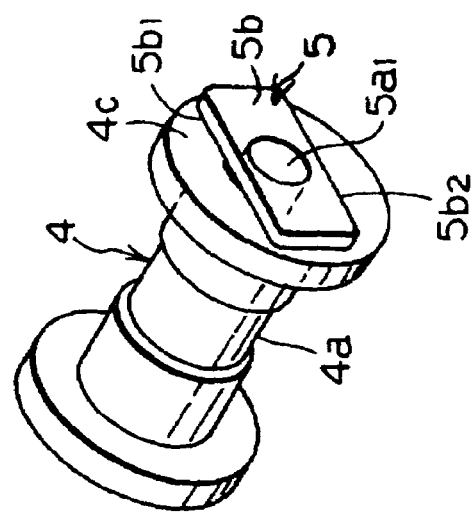
Fig.5A
Fig.5B

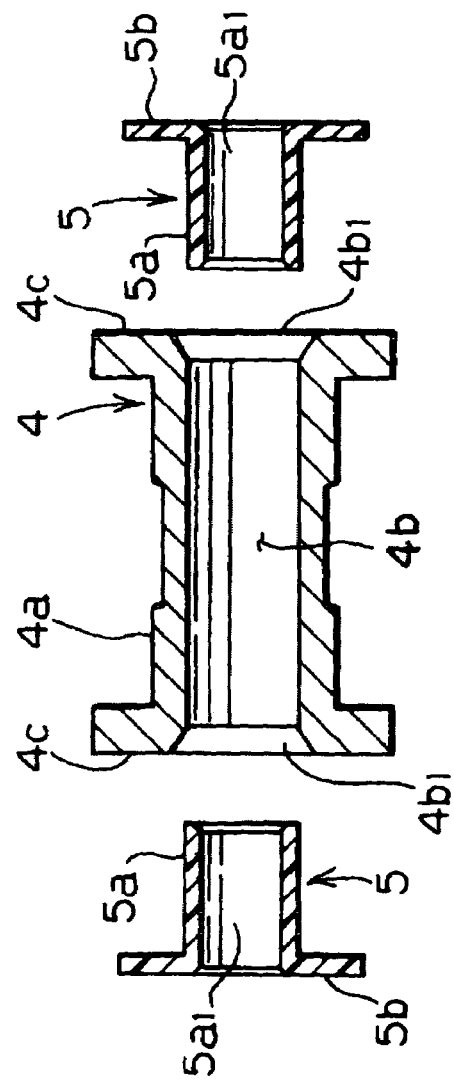
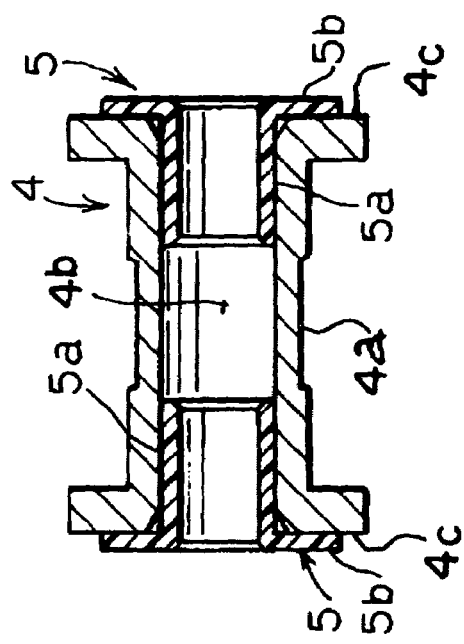
Fig.6A
Fig.6B

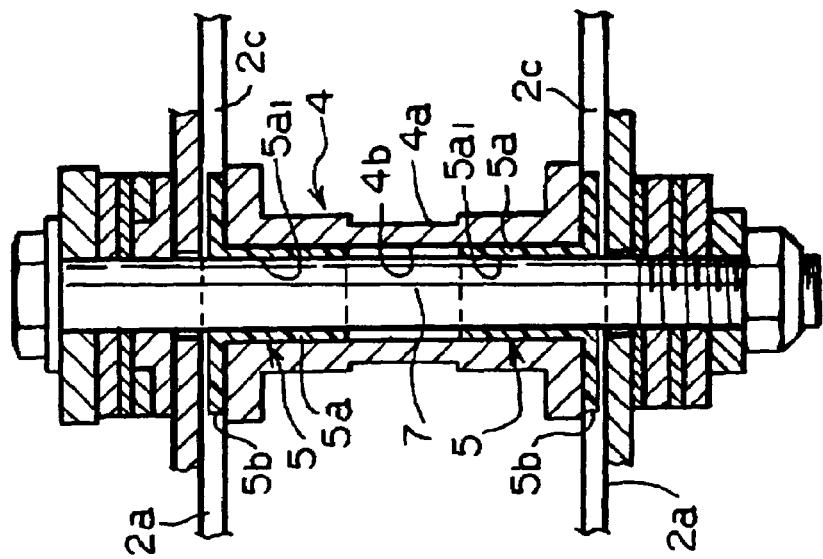
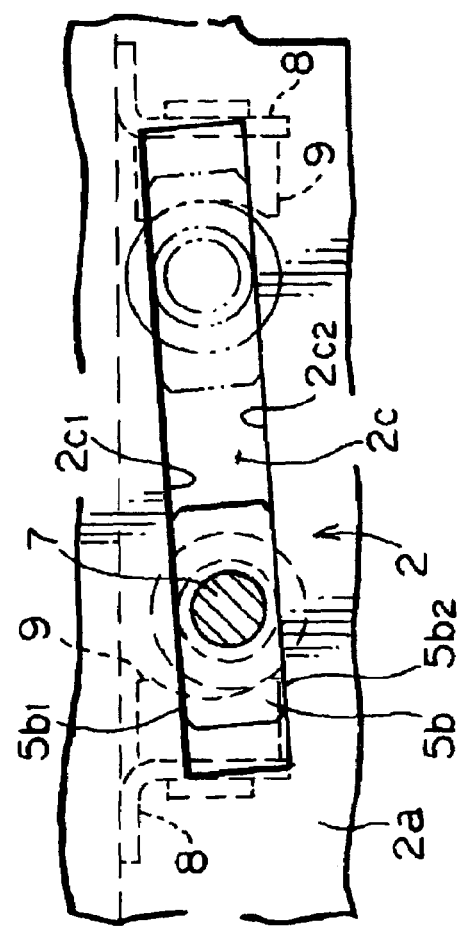

STEERING DEVICE

BACKGROUND OF THE INVENTION

1. Field of the Invention

The present invention relates to a steering device for which good operation feeling can be obtained in tilt and telescopic adjustments, and whose configuration is very simple.

2. Description of the Related Art

Conventionally, steering devices provided with tilt and telescopic adjustment mechanisms are known. In particular, in recent years importance has been placed on good operation feeling in tilt and telescopic adjustments, and many methods have been devised to reduce the noise produced during operation and to make the feeling during operation soft. One example of such a steering device is Japanese Patent Application Laid-open No. 2000-16303. This had an object to improve the sliding characteristics in the direction of telescoping. Rattle in the steering wheel is reduced mainly by interposing bushes 83, 84 and resin sheets 91, 92 between a column side bracket 73 and a vehicle body side bracket 72.

SUMMARY OF THE INVENTION

However, in the configuration seen in Japanese Patent Application Laid-open No. 2000-16303, bushes 83, 84 and resin sheets 91, 92 are interposed between the vehicle body side bracket 72 and the column side bracket 73. Therefore the width of the vehicle body side bracket 72 is increased, so there is a problem that the steering device itself becomes larger, and the steering column itself becomes expensive. Also, the configuration of the bushes 83, 84 is complex, with slits 83b, 84b, and projections 83c, 84c. Therefore assembly is time consuming and the number of processes increases, so on this account also the cost can increase. It is an object of the present invention to provide a steering device with a very simple structure, with good operation feeling in tilt and telescopic adjustments, that is also easily assembled.

Therefore, as a result of dedicated research to solve the above problems, the inventors solved the problem with the invention according to claim 1, being a steering device wherein cylindrical parts formed in shock absorber members are inserted in the two end openings of an axial through hole formed in the axial direction of a collar member, flanges of the shock absorber members are slidably inserted into adjustment elongated holes formed on both sides in the width direction of a movable bracket, the movable bracket is arranged between fixed support side plates formed on both sides in the width direction of a fixed bracket, and a bolt is passed through adjustment holes formed in the fixed support side plates, the adjustment elongated holes, the collar member, and the shock absorber members to be freely tightened as required.

Next, the invention according to claim 2 solves the problem with a steering device that includes a fixed bracket; a movable bracket; a collar member having an axial through hole formed in the axial direction, arranged between the support side parts of the movable bracket; a pair of shock absorber members comprising a cylindrical part that is inserted into the hole openings of the axial through hole and a flange part; and a bolt, wherein the cylindrical part of the pair of shock absorber members is inserted into the two ends of the axial through hole of the collar member, the flange parts are inserted into the pair of adjustment elongated holes, and the bolt is passed through the adjustment holes on the pair of fixed support side plates formed in the fixed bracket, the adjustment elongated holes in the movable bracket, the axial through hole of the collar member, and the cylindrical part of the pair of shock absorber members to be freely tightened as required.

Next, the invention according to claim 3 solves the problem with a steering device according to the above configuration, wherein the thickness of the flange part of the shock absorber member is formed smaller than the depth dimension of the adjustment elongated hole of the movable bracket. Next, the invention according to claim 4 solves the problem with a steering device according to the above configuration, wherein the flange part of the shock absorbed member is formed in a substantially rectangular shape. The invention according to claim 5 solves the problem with a steering device according to the above configuration, wherein the shock absorber member is formed from synthetic resin.

According to the invention of claim 1, shock absorber members are fitted to the collar member, and the flanges of the shock absorber members are fitted to the adjustment elongated holes, the bolt is passed through the axial through hole of the collar member and connects the fixed bracket to the movable bracket, so the movement of the movable bracket when carrying out tilt and telescopic adjustments is stabilized and smooth. Also, the configuration of the invention according to claim 2 is simple, the number of components is small, and assembly is very simple. The other effects are the same as the effects of claim 1.

Next, according to the invention of claim 3, the thickness of the flange part of the shock absorber member is formed smaller (thinner) than the dimension of the depth of the adjustment elongated hole of the movable bracket. Therefore the flange part can be accommodated within the range of the depth of the adjustment elongated hole, so when the bolt is tightened in the tilt and telescopic adjustment mechanism, the mechanism can be securely locked. According to the invention of claim 4, the flange part of the shock absorber member is formed in an approximately rectangular shape. Therefore there is approximate plane contact conditions between the opposing two sides of the flange part and the opposing inner side edges of the adjustment elongated hole, so the sliding characteristics of the shock absorbing members in particular can be improved.

Next, according to the invention of claim 5, the shock absorbing member is made from a synthetic resin. Therefore the flange part of the shock absorbing member can slide smoothly and quietly relative to the adjustment elongated hole. Therefore sliding noise can be reduced when carrying out tilt and telescopic adjustments.

BRIEF DESCRIPTION OF THE DRAWINGS

FIG. 5A is an isometric view of the collar member and shock absorber members separated, 5B is an isometric view of the shock absorber members fitted to the collar member;

FIG. 6A is a sectioned view of the collar member and shock absorber members separated, 6B is an sectioned view of the shock absorber members fitted to the collar member;

FIG. 7A is an enlarged view partially sectioned of the bolt fitted to the adjustment elongated hole via the collar member and the shock absorbed members, 7B is a section in plan of the bolt fitted to the fixed bracket and movable bracket via the collar member and shock absorber members.

DESCRIPTION OF THE PREFERRED EMBODIMENTS

Figure 1A:
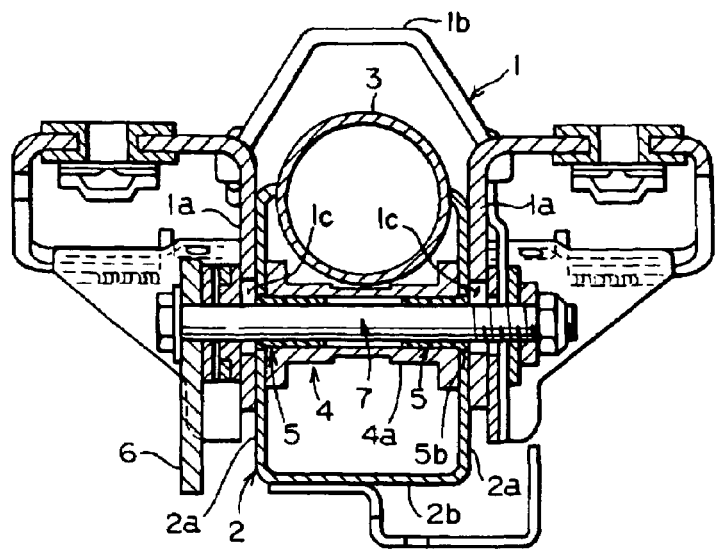
FIG. 1A is a sectioned front view of the present invention, 1B is an enlarged view partly sectioned of the collar member and the shock absorbing members, 1C is an enlarged view of 1B.
Figure 2:
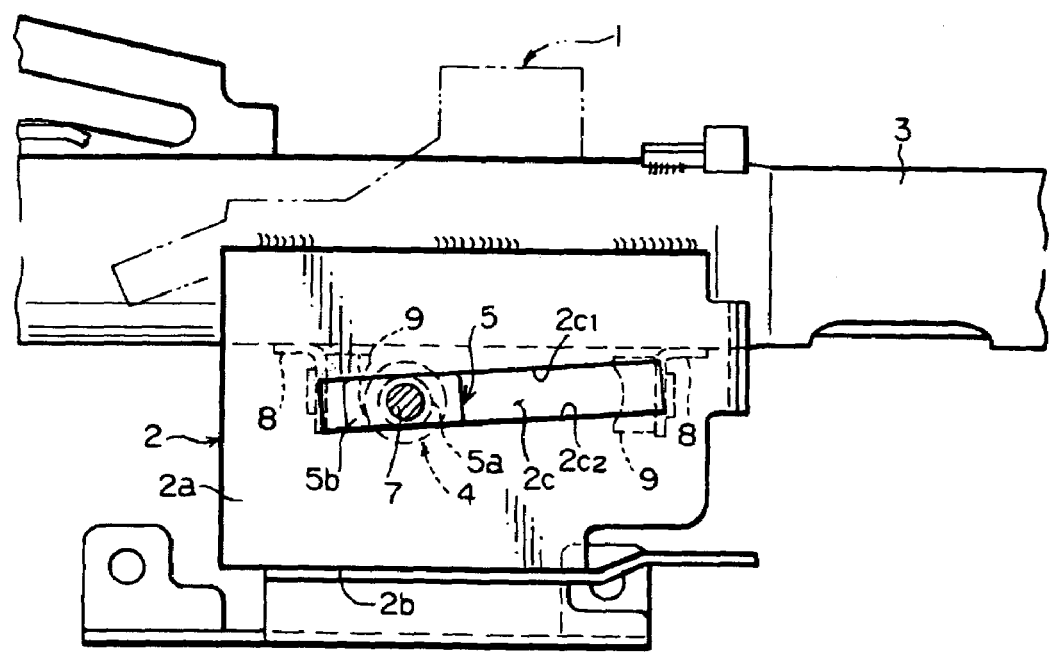
FIG. 2 is a side view of the movable bracket.
Figure 3:
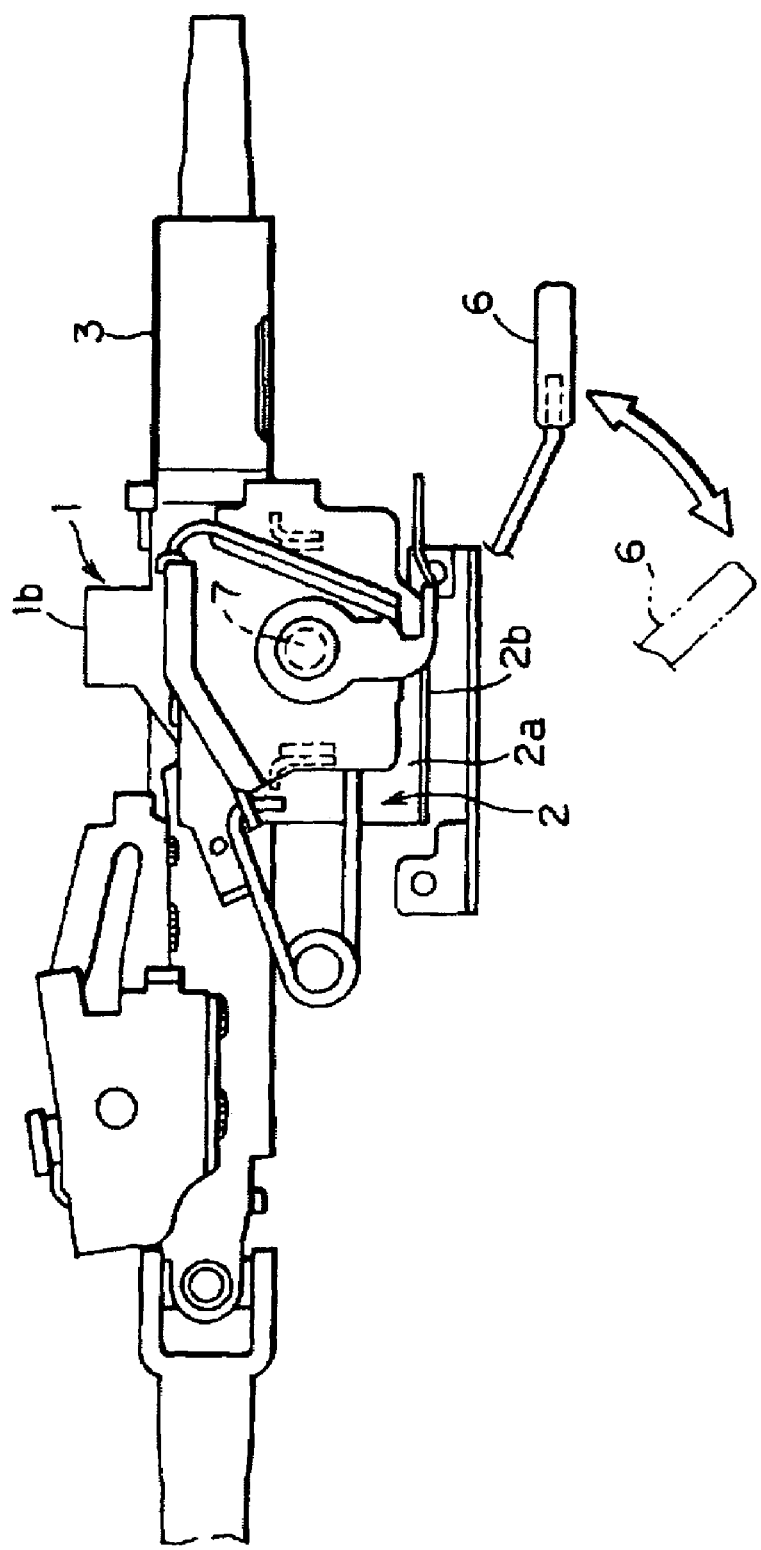
FIG. 3 is a side view of a steering device according to the present invention.

The following is an explanation of the preferred embodiments of the present invention, based upon the drawings. Firstly, as shown in FIGS. 1A, 2, 3, etc., the present invention mainly includes a fixed bracket 1, a movable bracket 2, a collar member 4, and a locking lever 6. The fixed bracket 1 includes a pair of fixed support side plates 1a, 1a on the left and right, and an installation head component 1b. The installation head component 1b is fixed to a prescribed location within a vehicle via a capsule member, and is capable of absorbing impact energy during an impact.

A pair of support side parts 2a, 2a, is formed at both sides in the width direction of the movable bracket 2, as shown in FIGS. 1A and 2. A bottom surface part 2b is formed in the bottom of the movable bracket 2 integrally connected to the pair of support side parts 2a, 2a. A steering column 3 is fitted between and fixed by welding to the tops of the pair of support side parts 2a. The pair of support side parts 2a, 2a is fitted between the pair of fixed support side plates 1a, 1a of the fixed bracket 1. A pair of adjustment elongated holes 2c, 2c is formed in the pair of support side parts 2a, 2a of the movable bracket 2 for tilt and telescopic adjustments.

The adjustment elongated holes 2c, 2c are through holes formed in the movable bracket 2 as slits or as straight lines in the long direction of the steering column 3 (see FIG. 2). Also, a pair of adjustment holes 1c, 1c is formed in the pair of fixed support side plates 1a, 1a of the fixed bracket 1 for a tilt and telescopic adjustment mechanism. The pair of adjustment holes 1c, 1c is aligned with the adjustment elongated holes 2c, 2c of the movable bracket 2, through which a bolt 7 is passed via a collar member 4 and a pair of shock absorber members 5 that are described later. A locking lever 6 is fitted to the bolt 7. In the tilt and telescoping adjustment mechanism, the fixed bracket 1 and the movable bracket 2 are locked or the lock is released by the rotation operation of the locking lever.

Figure 1B:
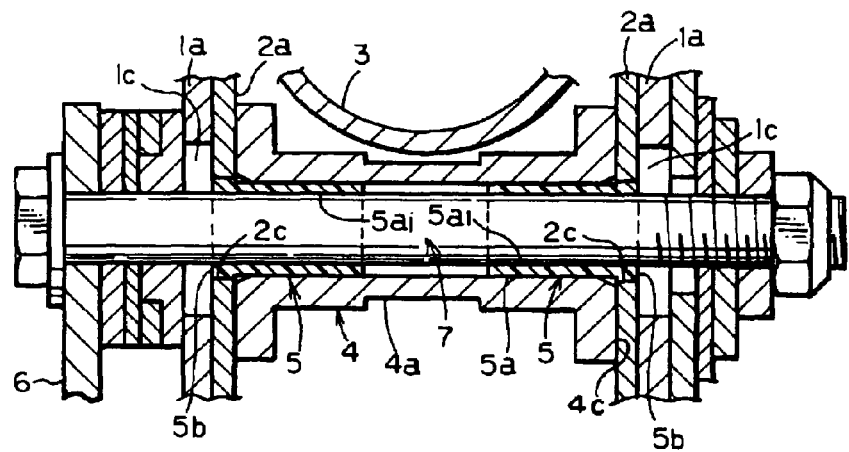
Figure 4:
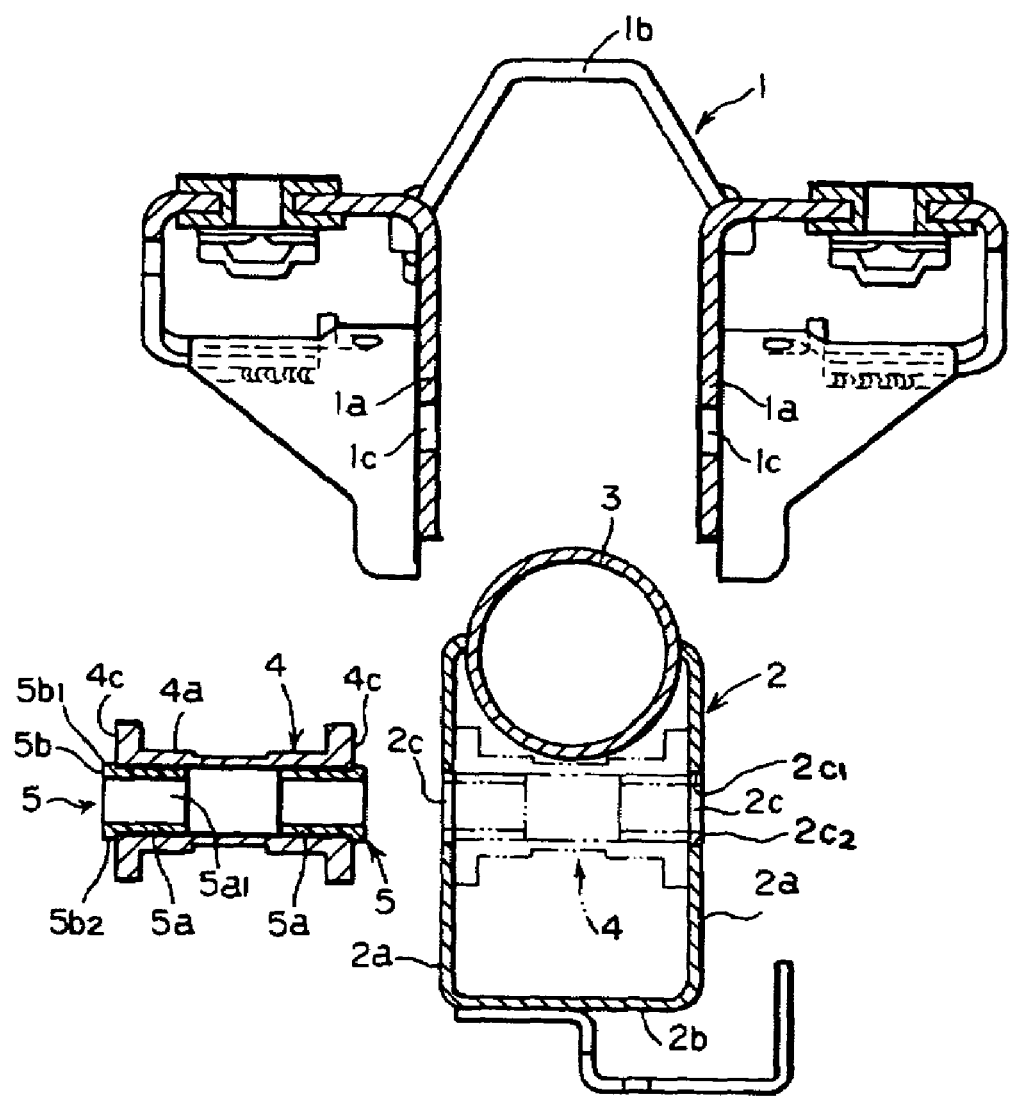
FIG. 4 is a front view of an exploded vertical section of the present invention.

Next, the collar member 4 is an approximately cylindrical shape, and includes a cylinder part 4a through which an axial through hole 4b is formed in the axial direction, as shown in FIGS. 5A and 6A. The collar member 4, as shown in FIGS. 1A, 1B, and 4, is arranged between the pair of support side parts 2a, 2a of the movable bracket 2 at the position of the pair of adjustment elongated holes 2c, 2c. The bolt 7, which is described later, passes through the adjustment elongated holes 2c, 2c and the axial through hole 4b with clearance and connects the fixed bracket 1 with the movable bracket 2.

The cylinder part 4a has a cylindrical shape, and at the ends and the center in the axial direction the diameter varies to give a stepped cylindrical shape. In other words, at the central position in the axial direction the diameter is minimum, at the ends in the axial direction the diameter is a maximum, and in between there are two steps. Furthermore, the length in the axial direction of the parts with the maximum diameter at the ends in the axial direction is short, to form approximate rim shapes. A pair of axial end surfaces 4c are formed as plane surfaces at right angles to the axial direction at the ends of the cylinder part 4a in the axial direction. A pair of hole openings $4b_1$ of the axial through hole 4b is positioned in the center in the radial direction of the axial end surfaces 4c. A sloping end surface is formed around the periphery of the pair of hole openings $4b_1$.

Next, the shock absorber member 5 includes a cylindrical part 5a and a flange part 5b, as shown in FIGS. 5A and 6A. The shock absorber member 5 is fitted to the collar member 4, and fitted between the pair of support side parts 2a, 2a of the movable bracket 2. Also, the shock absorber member 5 is made from a synthetic resin. The cylindrical part 5a is inserted in the axial through hole 4b of the collar member 4, as shown in FIGS. 1B, 4, 5B, and 6B, and elsewhere.

The collar member 4 through which the bolt 7 is inserted performs the role of a bearing. In other words, a bearing hole $5a_1$ is formed by the internal peripheral surface of the cylindrical part 5a. The flange part 5b is formed in a plate shape, whose surface is formed at right angles to the axial direction of the cylindrical part 5a. The shape of the flange part 5b is an orthogonal shape, or more specifically a rectangular shape.

Figure 1C:
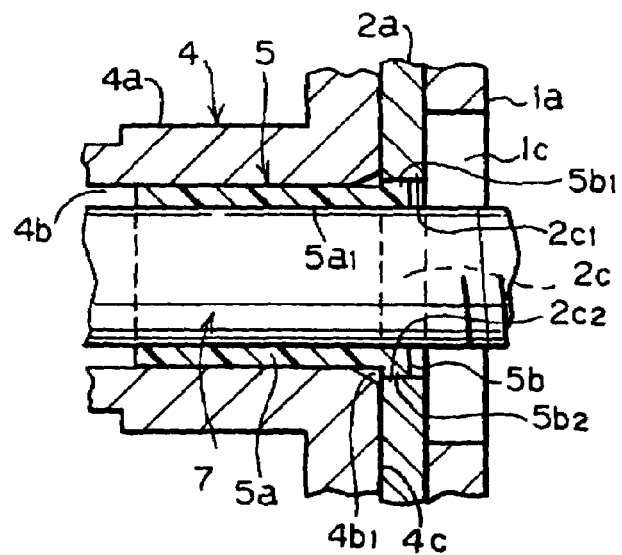

The flange part 5b is inserted in the adjustment elongated hole 2c of the movable bracket 2, as shown in FIGS. 1, 2, and 7, etc. Specifically, the long direction of the rectangle is inserted along the long direction of the adjustment elongated hole 2c. In other words, in the flange part 5b, two opposing sides are sliding sides $5b_1$, $5b_2$, and the flange part 5b is inserted into the adjustment elongated hole 2c so that the two sliding sides $5b_1$, $5b_2$ are in confrontation with an internal upper edge $2c_1$ and an internal lower edge $2c_2$. Then the flange 5b inserted within the adjustment elongated hole 2c can slide freely along the long direction of the adjustment elongated hole 2c.

At the position of sliding contact of the flange part 5b and the adjustment elongated hole 2c there is contact or approximate contact. It is desirable that the dimensions of the flange part 5b and the adjustment elongated hole 2c be chosen so that the shock absorber member 5 cannot rattle or vibrate with respect to the adjustment elongated hole 2c, and can slide in a stable and smooth manner. In other words, the distance between the positions on the flange part 5b where there is contact with the upper and lower inner surfaces of the adjustment elongated hole 2c should be the same or slightly larger than the distance between the upper and lower inner surfaces of the adjustment elongated hole 2c. The upper and lower inner surfaces of the adjustment elongated hole 2c are referred to as the inner upper edge 2c, and the inner lower edge $2c_2$.

Also, the shape of the flange part 5b is rectangular or similar, so at the location of contact with the inner upper edge $2c_1$ and inner lower edge $2c_2$ of the adjustment elongated hole 2c there is plane contact. However, if the flange part 5b had the shape of a circular plate, there would be point contact at the positions of contact with the inner upper edge $2c_1$ and the inner lower edge $2c_2$.

Also, the most suitable material for the shock absorber member 5 is a synthetic resin. However, rubber or similar may also be used. In particular, if the shock absorber member 5 is formed from synthetic resin the flange part 5b will be able to slide smoothly with respect to the adjustment elongated hole 2c and there will be very little sliding noise.

Figure 8:
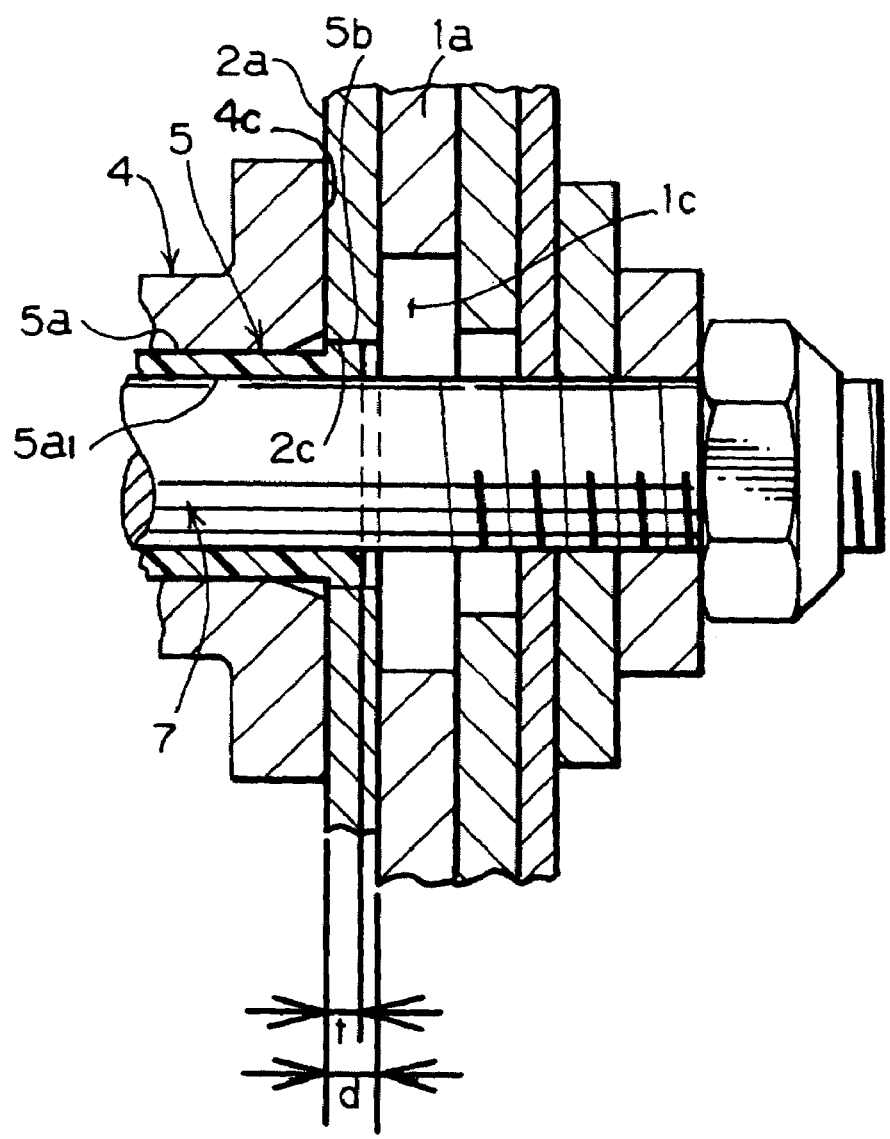
FIG. 8 is an enlarged sectional view showing the thickness dimension of the flange part smaller than the depth dimension of the adjustment elongated hole.

Also, the shape of the flange part 5b may be square instead of rectangular. Furthermore, as a non-rectangular shape, the shape may be a circular plate shape. The flange part 5b may be any shape provided as stated previously the flange part 5b can slide freely within the adjustment elongated hole 2c. Also, the thickness dimension of the plate thickness of the flange part 5b of the shock absorbing member 5 is formed smaller (thinner) than the depth dimension of the adjustment elongated hole 2c of the movable bracket 2. Specifically, the thickness t of the flange part 5b is formed thinner than the depth d of the adjustment elongated hole 2c of the movable bracket 2 (see FIG. 8). In other words, the size relationship of the thickness dimensions can be expressed by (d>t). Also, the difference in thickness dimensions may be small. Also, the thickness dimension of the flange part 5b of the shock absorbing member 5 may be approximately the same as the depth dimension of the adjustment elongated hole 2c of the movable bracket 2. In other words, the dimensional relationship is such that the flat surface of the flange part 5b does not project beyond the support side part 2a of the movable bracket 2.

In this way, the thickness of the flange part 5b is smaller than the dimension of the depth of the adjustment elongated hole 2c. Therefore the flange part 5b can be accommodated within the thickness of the adjustment elongated hole 2c, so the shock absorber member 5 can slide easily relative to the adjustment elongated hole 2c. Also, in the tilt and telescopic mechanism, when the bolt 7 is tightened, a uniform contact condition can be achieved between the fixed support side plate 1a of the fixed bracket 1, the support side part 2a of the movable bracket 2, and the axial end surface 4c of the collar member 4, so it is possible to securely lock the device.

The present invention is assembled by first fitting the shock absorber members 5 to both ends of the collar member 4, by inserting the cylindrical part 5a of the shock absorber member 5 from the hole opening 4b1 of the axial through hole 4b of the collar member 4. Then the flange parts 5b of the shock absorber members 5 are inserted in the adjustment elongated holes 2c, 2c of the movable bracket 2 so that they can slide freely, and the collar member 4 is fitted between the pair of support side parts 2a, 2a.

Then the fixed support side plates 1a, 1a of the fixed bracket 1 are arranged so that they sandwich the pair of support side parts 2a, 2a of the movable bracket 2. The positions of the adjustment elongated holes 2c, 2c and the adjustment holes 1c, 1c are aligned, and the bolt 7 is passed through the axial through hole 4b of the collar member 4 via the shock absorber members 5, 5. Also, the locking lever 6 is fitted to the bolt 7. Therefore by the rotational operation of the locking lever 6, the fixed support side plates 1a, 1a of the fixed bracket 1 are either tightened and fixed to the support side parts 2a, 2a of the movable bracket 2, or released, so that tilt and telescopic adjustments can be carried out.

What is claimed is:

1. A steering device, wherein
a cylindrical part formed in a pair of shock absorber members is inserted in two end openings of an axial through hole formed in the axial direction of a collar member,
flanges of the shock absorber members are slidably inserted so that they can freely slide and are positioned within boundaries defined by adjustment elongated holes formed on both sides of a movable bracket,
the movable bracket is arranged between fixed support side plates formed on both sides in the width direction of a fixed bracket, and
a bolt is passed through adjustment holes formed in the fixed support side plates, the adjustment elongated holes, the collar member, and the shock absorber members.

2. The steering device according to claim 1, wherein
a thickness of the flanges of the shock absorber members is formed smaller than a depth dimension of the adjustment elongated holes of the movable bracket.

3. The steering device according to claim 2, wherein the flange part of the shock absorber members is formed in a substantially rectangular shape.

4. The steering device according to claim 2, wherein the shock absorber members comprise synthetic resin.

5. The steering device according to claim 1, wherein the flanges of the shock absorber members are formed in a substantially rectangular shape.

6. The steering device according to claim 5, wherein the shock absorber members comprise synthetic resin.

7. The steering device according to claim 1, wherein the shock absorber members comprise synthetic resin.

8. A steering device, comprising:
a fixed bracket;
a movable bracket including support side parts;
a collar member having an axial through hole formed in the axial direction, arranged between the support side parts of the movable bracket;
a pair of shock absorber members comprising a cylindrical part that is inserted into the hole openings of the axial through hole and a flange part; and
a bolt, wherein
the cylindrical part of the pair of shock absorber members is inserted into two ends of the axial through hole of the collar member,
the flange parts are inserted into a pair of adjustment elongated holes formed in the movable bracket, and
the bolt is passed through the adjustment holes on the pair of fixed support side plates formed in the fixed bracket, the adjustment elongated holes in the movable bracket, the axial through hole of the collar member, and the cylindrical part of the pair of shock absorber members.

9. The steering device according to claim 8, wherein a thickness of the flange part of the shock absorber members is formed smaller than a depth dimension of the adjustment elongated holes of the movable bracket.

10. The steering device according to claim 8, wherein the flange part of the shock absorber members is formed in a substantially rectangular shape.

11. The steering device according to claim 8, wherein the shock absorber members comprise synthetic resin.

12. A steering device, comprising:
a collar member having first and second ends;
first and second shock absorbers inserted into the first and second ends, respectively, of the collar member;
a bolt passing through the collar member and the first and second shock absorbers; and
a movable bracket having adjustment holes,
wherein the first and second shock absorbers include a flange that is positioned and slides within a depth of the adjustment holes of the movable bracket.

* * * * *